US 10,919,193 B2

(12) United States Patent
Mai et al.

(10) Patent No.: US 10,919,193 B2
(45) Date of Patent: Feb. 16, 2021

(54) PRODUCTION OF TEXTILE COMPOSITE MATERIAL PREFORMS (71) Applicant: Bayerische Motoren Werke Aktiengesellschaft, Munich (DE)

(72) Inventors: Horst Mai, Furth (DE); Eva Honickel, Eching (DE); Joerg Baderschneider, Landshut (DE); Mirko Schade, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 15/978,889

(22) Filed: May 14, 2018

(65) Prior Publication Data

US 2018/0257272 A1 Sep. 13, 2018

Related U.S. Application Data (63) Continuation of application No. PCT/EP2016/076489, filed on Nov. 3, 2016.

(30) Foreign Application Priority Data

Nov. 26, 2015 (DE) ...................... 10 2015 223 364.2

(51) Int. Cl.
*B29C 43/36* (2006.01)
*B29B 11/16* (2006.01)
(Continued)

(52) U.S. Cl.
CPC ............. *B29C 43/36* (2013.01); *B29B 11/16* (2013.01); *B29C 43/003* (2013.01); *B29C 43/02* (2013.01);
(Continued)

(58) Field of Classification Search
None
See application file for complete search history.

(56) References Cited

U.S. PATENT DOCUMENTS 8,702,884 B2    4/2014  Kuntz et al.
9,211,679 B1 *  12/2015 Metschan ............... B29C 70/30
(Continued)

FOREIGN PATENT DOCUMENTS

CN    105073365 A    11/2015
DE    693 04 042 T2  12/1996
(Continued)

OTHER PUBLICATIONS

Chinese Office Action issued in Chinese counterpart application No. 201680049546.3 dated May 15, 2019 (Seven (7) pages).
(Continued)

*Primary Examiner* — Matthew J Daniels
*Assistant Examiner* — Paul Spiel
(74) *Attorney, Agent, or Firm* — Crowell & Moring LLP (57) ABSTRACT A method for producing textile composite material preforms, particularly with or from one or more textile semi-finished products, includes compression molding a planar structure of one or more textile composite materials. The planar structure is cut laterally into textile composite material sections prior to compression molding and these cut textile composite material sections undergo compression molding individually or collectively and particularly with one or more other textile composite material sections such that as a result one or more textile composite material preforms are fully or partially formed.

8 Claims, 7 Drawing Sheets (51) Int. Cl.
*B29C 70/54* (2006.01)
*B29C 70/48* (2006.01)
*B29C 70/56* (2006.01)
*B29C 43/02* (2006.01)
*B29K 105/08* (2006.01)
*B29C 43/00* (2006.01)
*B29K 307/04* (2006.01)

(52) U.S. Cl.
CPC .............. *B29C 70/48* (2013.01); *B29C 70/54* (2013.01); *B29C 70/56* (2013.01); *B29C 70/545* (2013.01); *B29C 2043/3602* (2013.01); *B29C 2793/0081* (2013.01); *B29K 2105/089* (2013.01); *B29K 2307/04* (2013.01)

(56) References Cited

U.S. PATENT DOCUMENTS

| | | | |
|---|---|---|---|
| 2003/0138602 A1 | 7/2003 | Lorenz et al. | |
| 2013/0108878 A1 | 5/2013 | Kleine et al. | |
| 2016/0059498 A1* | 3/2016 | Graf ........................ | B29C 70/48 428/174 |
| 2016/0354951 A1* | 12/2016 | Mai ....................... | B29C 70/543 |

FOREIGN PATENT DOCUMENTS

| | | |
|---|---|---|
| DE | 100 50 851 A1 | 4/2002 |
| DE | 10 2009 021 591 A1 | 1/2011 |
| DE | 10 2010 022 168 A1 | 11/2011 |
| DE | 10 2010 040 970 A1 | 3/2012 |
| DE | 10 2011 054 915 A1 | 5/2013 |
| DE | 10 2011 119 223 A1 | 5/2013 |
| DE | 10 2013 103 039 A1 | 9/2014 |
| DE | 10 2013 009 046 A1 | 12/2014 |
| DE | 10 2014 205 479 A1 | 10/2015 |
| EP | 0 620 091 A1 | 10/1994 |
| EP | 2 474 410 A1 | 7/2012 |
| GB | 2485758 A | 5/2012 |
| WO | WO 2014/154720 A1 | 10/2014 |
| WO | WO 2015/032986 A1 | 3/2015 |

OTHER PUBLICATIONS

PCT/EP2016/076489, International Search Report dated Mar. 31, 2017 (Five (5) pages).

German Search Report issued in German counterpart application No. 10 2015 223 364.2 dated Aug. 23, 2016, with Statement of Relevancy (Seven (7) pages).

* cited by examiner

PRODUCTION OF TEXTILE COMPOSITE MATERIAL PREFORMS

CROSS REFERENCE TO RELATED APPLICATIONS

This application is a continuation of PCT International Application No. PCT/EP2016/076489, filed Nov. 3, 2016, which claims priority under 35 U.S.C. § 119 from German Patent Application No, 10 2015 223 364.2, filed Nov. 26, 2015, the entire disclosures of Which are herein expressly incorporated by reference.

BACKGROUND AND SUMMARY OF THE INVENTION

The present invention relates to a method for producing textile composite material preforms, in particular comprising or made from one or a plurality of textile semi-finished products, and to a device for producing textile composite material preforms, in particular comprising or made from one or a plurality of textile semi-finished products.

In the case of known methods for producing textile composite material preforms, the initial textile composite material is provided in the manner of a planar structure and subjected to a process of, in particular dry, compression molding. The portions of the compression-molded planar structure that form the textile composite material preforms are cut out of the composite and singularized only after the dry compression molding process.

It is disadvantageous herein that a substantial proportion of already compression-molded material that as material surplus has been cut away from the respective textile composite material preform is created and that this material surplus has to be recycled in a complex manner. This increases complexity in terms of process technology and the energy input in the case of methods of this type.

The invention is therefore based on the object of specifying methods and devices for producing textile composite material preforms, which methods and devices can produce textile composite material preforms in a particularly simple and nevertheless reliable manner at a reduced input of material and energy.

According to a first aspect, the present invention provides a method for producing textile composite material preforms, in particular comprising or made from one or a plurality of textile semi-finished products or textile reinforcement structures, for example comprising or made from carbon-fiber reinforced plastics materials or CRP materials, by compression molding a planar structure of one or a plurality of textile composite materials, in which method (i) the planar structure prior to compression molding is laterally cut into textile composite material portions or is generally pre-tailored, and (ii) the cut or generally pre-tailored textile composite material portions individually or as a plurality thereof, and in particular conjointly with one or a plurality of other textile composite material portions, are subjected to compression molding so as to on account thereof fully or partially configure one or a plurality of textile composite material preforms. According to the invention, pre-tailoring of the planar structure of the one or of the plurality of textile composite materials thus takes place prior to the actual procedure of compression molding, such that material surplus that does not belong to a textile composite material preform arises in an as yet not compressed form and is more easily regeneratable and recyclable at a lower investment in terms of energy. According to the invention, only the pre-tailored textile composite material portions are subjected to further processing by compression molding.

In the context of the invention, a textile composite material portion can also be referred to as a stack or a CF stack, and a textile composite material preform can also be referred to as a preform.

In order for the compression molding of the pre-tailored textile composite material portions to be able to be carried out in a particularly reliable manner, it is provided according to one advantageous refinement of the method according to the invention that a respective textile composite material portion prior to compression molding is fixed to a first carrier which in particular effects or facilitates aligning, pre-draping, mounting, and/or introducing of the forces for the forming of the textile composite material portion in the compression molding, wherein in particular (i) the textile composite material portion by way of a lower side bears in a planar manner on an upper side of the carrier, and/or (ii) the assembly of a first carrier and of the textile composite material portion on the upper side of the first carrier is covered by a second carrier and connected to the second carrier.

By way of the last-mentioned variant, the textile composite material portion, thus the CF stack, for example, is embedded in a sandwich-like manner in the carrier material. The first and the second carrier can be from the same material or be dissimilar. It is also conceivable for only one carrier to be provided, the one carrier for embedding the textile composite material portion or the stack being split and then being reunited.

Alternatively or additionally, it can be provided that a textile composite material portion or two textile composite material portions is/are fixed to the carrier in a separate manner on an upper side and on a lower side of a carrier, in particular in a manner so as to be flush with one another, such that in the final product the carrier remains in the product and an alternative sandwich structure is thus created.

The fixing on the carrier enables the introduction of pre-tensioning forces onto the respective pre-tailored textile composite material portion without an additional and cost-intensive textile composite material having to be made available for the pretensioning forces to engage, as is the case conventionally.

It is particularly advantageous herein for a high degree of compatibility to be obtained between the material of the textile composite material portions and the carrier material. This is achieved in particular when, according to another design embodiment of the method according to the invention, a respective carrier comprising or made from a textile carrier material and/or comprising or made from a planar material, in particular comprising or made from a film, is used, and/or the fixing of a respective textile composite material portion to the carrier is performed by stitching and configuring at least one seam having a seam material, and/or by adhesive bonding. The fixing can also be performed by other forms of connection and is not limited to stitching and adhesive bonding.

Particularly simple geometric conditions for the input of force in pre-tensioning and guiding the textile composite material portion on the carrier were attained when the at least one seam is at least partially configured as a contour seam and so as to be in the vicinity of a contour or of a periphery of the textile composite material portion.

While a single seam is in principle sufficient for fixing the textile composite material portion to the carrier, wherein in this instance a contour seam is particularly advantageous, a plurality of seams can also be provided for fixing a respective textile composite material portion to a carrier.

Alternatively or additionally to a contour seam, it is expedient for the at least one seam to be at least partially configured so as to be spaced apart from a contour of the textile composite material portion and/or so as not to be parallel with the contour and in particular so as to run perpendicularly to the contour. In this manner, a particularly inherent fixing of the respective textile composite material portion to the carrier can be achieved. This is advantageous in particular in the design of comparatively complex three-dimensional structures, because distortions of the textile composite material are avoided on account thereof.

A further simplification of the method according to the invention can be achieved when a respective carrier and/or the seam material are/is connected to a respective textile composite material portion as a component part of a textile composite material preform by the compression molding. In the case of this design embodiment, the processes which after the compression molding are required for releasing and separating the carrier material from the compression-molded textile composite material portion, thus from the textile composite material preform produced, are omitted.

Alternatively, in the case of another embodiment of the method according to the invention, it can be provided that the respective carrier after the compression molding is released from the lower side of a textile composite material preform generated, in particular by unpicking any potential seams and/or by way of a cut within the seam, or on the proximal side of the latter, that follows the contour or the seam.

A particularly reliable compression molding and thus configuration of textile composite material preforms is attained when, according to one particularly preferred embodiment of the method according to the invention, (i) the respective carrier is first pre-draped by pre-tensioning in a guiding manner, in particular by means of a guide frame that contacts only the carrier and in the interior of the guide frame laterally encloses the respective textile composite material portion, and (ii) the respective textile composite material portion along the contour thereof and/or along a seam, in particular by means of a main tentering frame and/or by means of the mold and the counter-mold, is then tensioned in a three-dimensional manner and on account thereof; under pressure, traction, and/or temperature, is configured so as to form a textile composite material preform.

A particularly high degree of material savings in terms of the textile composite material to be supplied results when cutting-to-size, and pre-tailoring in general, is adapted in terms of dimensions and/or further properties of a textile composite material preform to be produced and/or of a combination of a main tentering frame, a mold and/or a counter-mold to be used.

According to one further aspect, the present invention provides a device for producing textile composite material preforms, in particular comprising or made from one or a plurality of textile semi-finished products, for example comprising or made from CRP materials or the like, the device being specified in particular for carrying out the method according to the invention, having an external guide frame for externally aligning, pre-draping, and/or mounting a textile composite material portion that is fixed to a carrier by tensioning the carrier; an internal and three-dimensional main tentering frame and a mold assembly for shaping the textile composite material preform by compression molding the textile composite material portion that is aligned, pre-draped, and/or mounted by the external guide frame.

The mold assembly can have one or a plurality of molds and/or counter-molds which are configured for and operable in mutual interaction. The compression molding of the textile composite material portion is effected by the interaction of the mold and the counter-mold.

In the case of a plurality of molds and/or counter-molds, the molds and/or counter-molds can be capable of being operated in the device in a temporally adapted and a cascading manner from the inside to the outside. This can be performed in particular comprising a cascade slide, or in the manner of a cascade slide.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the invention will be described in detail hereunder with reference to FIGS. 1 to 18. The same and equivalent elements and components, or elements and components with the same or equivalent functions, are identified by the same reference signs. The detailed description of the elements and components identified is not reflected in each case of the appearance of the elements and components.

The features and further properties illustrated can be isolated from one another and combined with one another in an arbitrary manner without departing from the core concept of the invention.

FIGS. 1 to 4 in a schematic and sectional side view show intermediate states in the production of textile composite material preforms 30, the intermediate states being attained in one embodiment of the method according to the invention.

Figure 1:
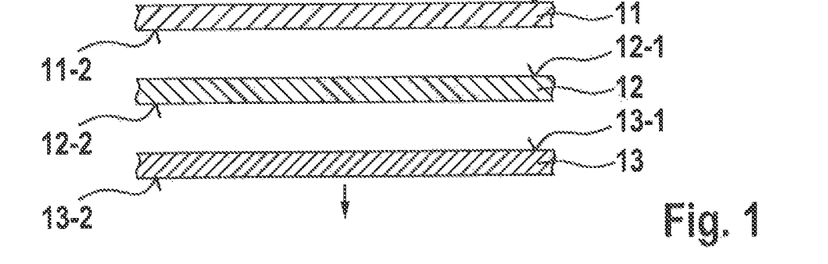
FIGS. 1 to 4 in a schematic and sectional side view show various intermediate states, which are attained in the case of one embodiment of the method according to the invention for producing textile composite material preforms.

According to FIG. 1, in the case of this embodiment three tiers of textile composite materials 11, 12, and 13 are supplied as a substantially planar formation.

The number of three tiers herein is chosen in a purely exemplary manner. Any arbitrary other number of tiers is conceivable. For example, a single tier of a single textile composite material can thus also be processed according to the invention.

The individual textile composite materials 11, 12, and 13 can be dissimilar or identical in pairs, specifically in terms of material as well as in terms of structure. For example, these can be identical basic materials but having a dissimilar arrangement and/or orientation of fibers, for example.

Each tier of a textile composite material 11, 12, 13 has an upper side 11-1, 12-1, 13-1, and a lower side 11-2, 12-2, or 13-2, respectively, that is opposite the upper side.

Figure 2:
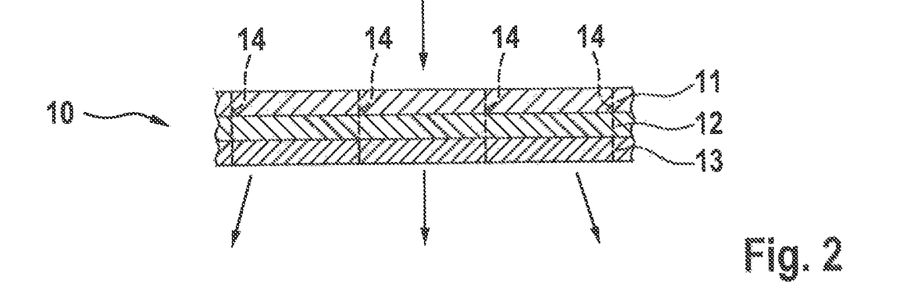

In the transition to the intermediate state shown in FIG. 2, a planar structure 10 is formed from the plurality of tiers of textile composite materials 11, 12, 13 by stacking and corresponding draping.

Figure 3:
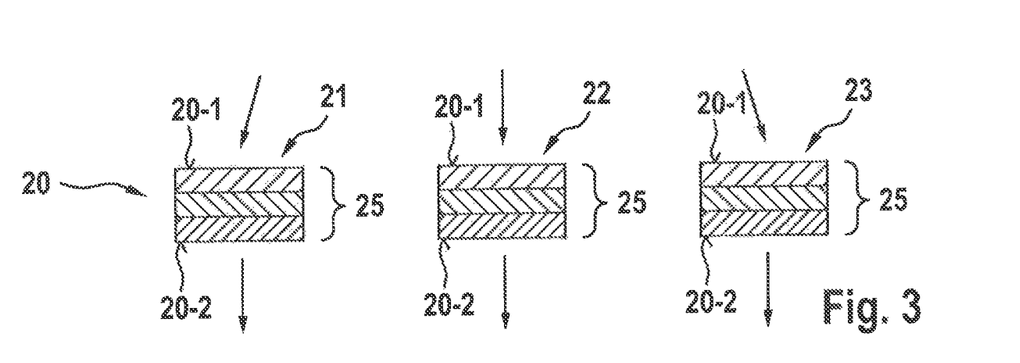

In the transition to the intermediate state illustrated in FIG. 3, according to the invention first a separation or a singularization of the planar structure 10 from textile composite materials 11, 12, 13 into a plurality of textile composite material portions 20 is then established, herein in an exemplary manner by way of a first, second, and third textile composite material portion 21, 22, and 23, respectively. The latter have in each case one upper side 20-1 and one lower side 20-2 and a contour 25 running therebetween, the contour 25 also potentially being referred to as a periphery.

The first to the third textile composite material portions 21 to 23 are not always mentioned individually hereunder, but in a representative manner are identified by the textile composite material portion 20 in general.

Figure 4:
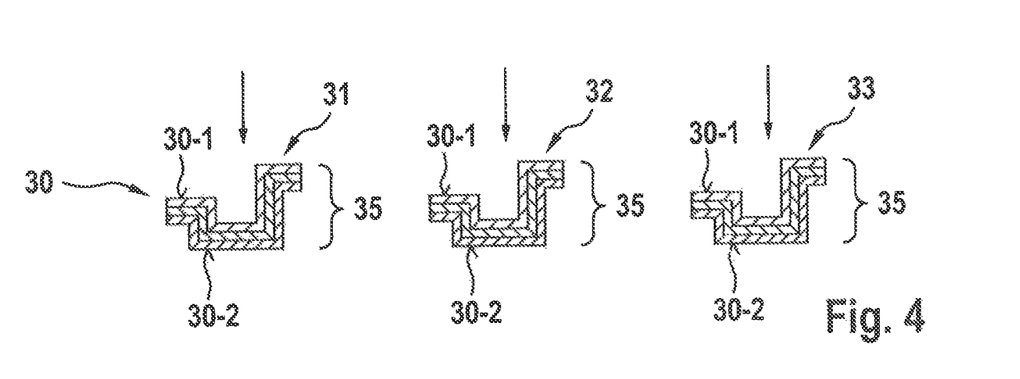

In the transition to the intermediate state illustrated in FIG. 4, the textile composite material portions 20 individually or collectively, but already as a singularized structure, are then subjected to a procedure of compression molding so as to configure a respective textile composite material preform 30, specifically a first, second, and third textile composite material preform 31, 32, and 33, respectively, having an upper side 30-1 and a lower side 30-2, and a contour 35 or periphery.

The sequence of FIGS. 1 to 4 in a purely schematic manner shows a core concept of the invention, specifically that of first singularizing textile composite material portions 20 from the supplied planar structure 10 of the textile composite material materials 11, 12, 13, and only thereafter subjecting the textile composite material portions 20 to processing by compression molding. On account thereof, the accumulation of material surplus is avoided to the largest extent according to the invention, as is indicated by the cutting lines 14 indicated in FIG. 2 in the planar structure 10 of the textile composite materials 11, 12, 13, the cutting lines in the transition to the state of FIG. 3 leading to the contours 25 of the individual textile composite material portions 20.

One objective in the case of the concept according to the invention is the reduction of cost by reducing the quantity of material input. Core concepts herein are (i) the fixing of the textile reinforcement structure, thus of the cut-to-size textile composite material portion 20 which is also referred to as the stack, to the more cost-effective material of the carrier 40, and (ii) the subsequent forming of fibers by way of cascade slides, in particular fixed from the inside to the outside, and (iii) the double tentering frame principle, specifically having an external guide frame 55 and an internal and three-dimensional main tentering frame 70 of the tool of the underlying device 50, in order for the form-fit to remain guaranteed for the forming.

Figure 5:
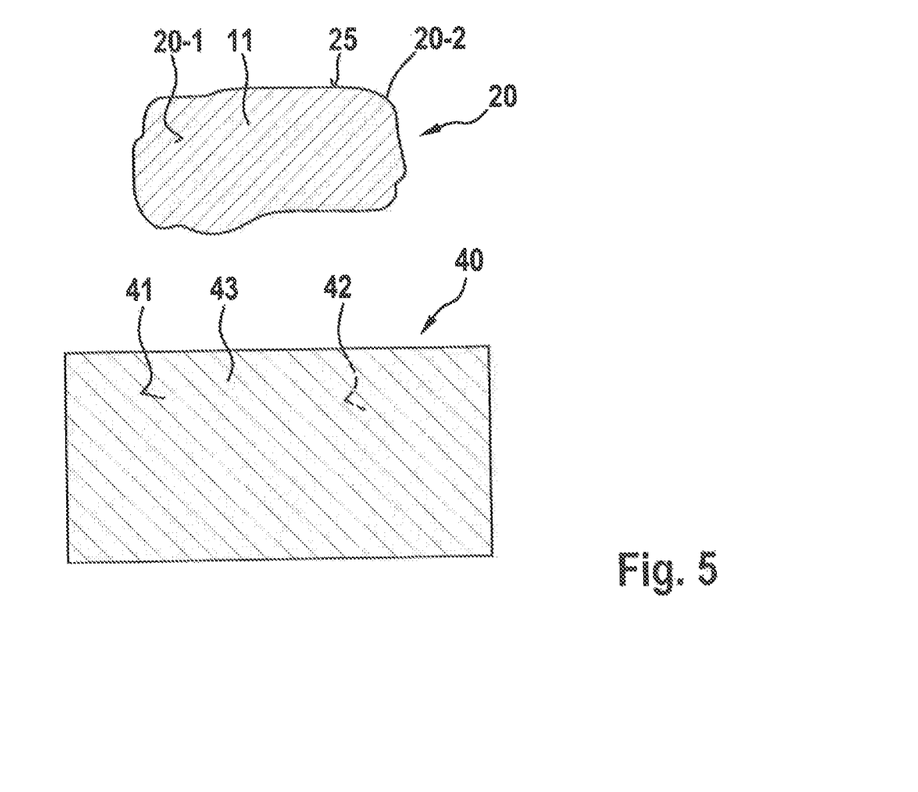
FIGS. 5 and 6 in a schematic plan view show partial aspects of another embodiment of the method according to the invention for producing textile composite material preforms.
Figure 6:
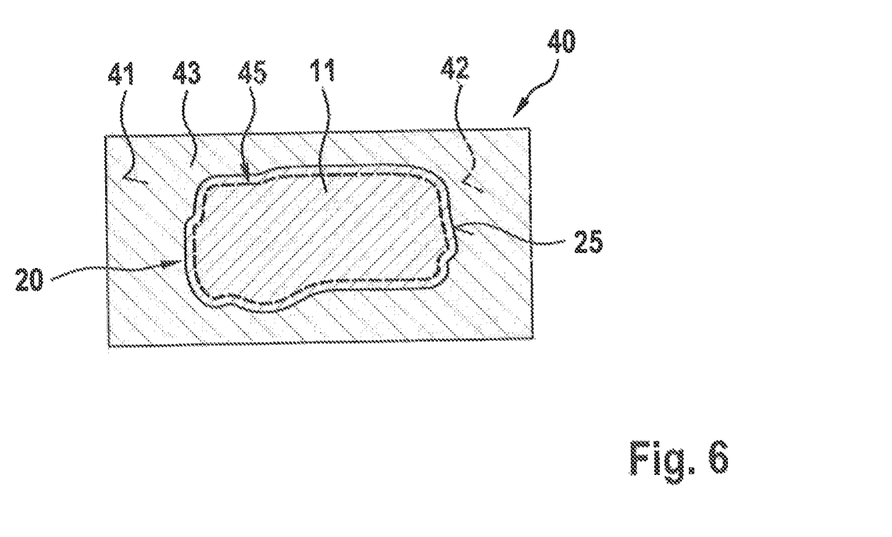

FIGS. 5 and 6 in a plan view and in a schematic manner show aspects of intermediate states which are attained in the case of another embodiment of the method according to the invention for producing textile composite material preforms.

According to FIG. 5, in the case of this embodiment of the method according to the invention a singularized textile composite material portion 20 made from a textile composite material 11, having an upper side 20-1 and a lower side 20-2, and a contour 25 or periphery, is first supplied.

Furthermore, a carrier 40 made from a carrier material 43, having an upper side 41 and a lower side 42, is provided.

In the transition to the intermediate state illustrated in FIG. 6, the textile composite material portion 20 which can also be referred to as the stack, by way of the lower side 20-2 thereof is then placed onto the upper side 41 of the carrier 40 and by way of a seam 45 made from a seam material 46 is fixed to the upper side 41 of the carrier 40. The profile of the seam 45 herein substantially follows the profile of the contour 25 of the textile composite material portion 20 or of the stack, being locally parallel with the profile of the contour 25.

By fixing the textile composite material portion 20 to the carrier 40 it is possible as hitherto, however with a lower input of material in terms of the textile composite material 11, for respective tensile forces to be applied in a defined manner in pre-draping, aligning, and/or mounting the textile composite material portion, specifically by way of a respective engagement on the carrier material 43 of the carrier 40 per se, that is to say without additional textile composite material having to be provided.

The assembly of the carrier 40 and the textile composite material portion 20 fixed thereto, illustrated in FIG. 6, is then subjected to the underlying procedure of compression molding so as to shape a textile composite material preform 30 from the textile composite material portion 20 that is fixed to the carrier 40.

FIGS. 7 to 10 in a schematic and sectional side view show aspects of another embodiment of the production method according to the invention, specifically while using a device 50 for producing textile composite material preforms 30.

Figure 7:
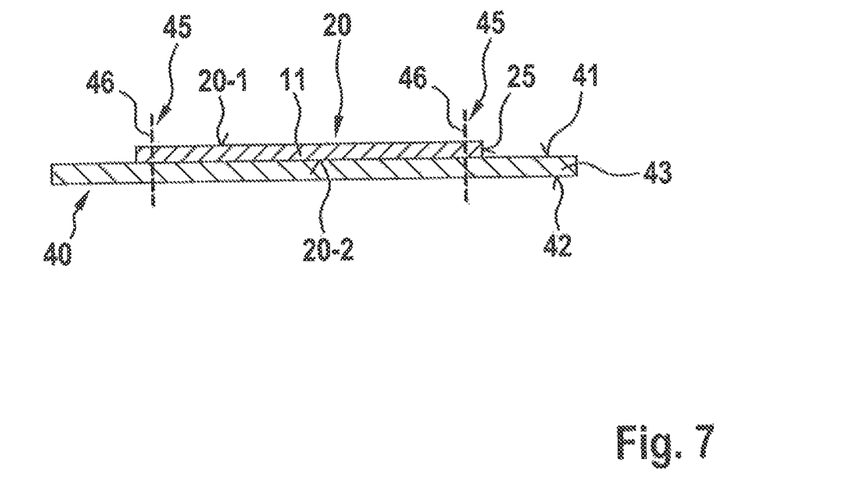
FIGS. 7 to 10 in a schematic and sectional side view show intermediate states which are attained in the case of another embodiment of the method according to the invention while using an embodiment of the device according to the invention for producing textile composite material preforms.

The illustration of FIG. 7 shows approximately the situation of FIG. 6. A carrier 40 having an upper side 41 to which a textile composite material portion 20 is fixed by way of a seam 45 having a seam material 46 is supplied. The lower side 20-2 of the textile composite material portion 20 herein bears on the upper side 41 of the carrier 40. The carrier 40 is composed of a carrier material 43 which is preferably likewise a textile material, this however not being mandatory.

The textile composite material portion 20 per se is composed of a textile composite material 11 and, apart from the lower side 20-2 for bearing on the upper side 41 of the carrier 40 per se, has an upper side 20-1 and a contour 25 which can also be referred to as a periphery.

Figure 8:
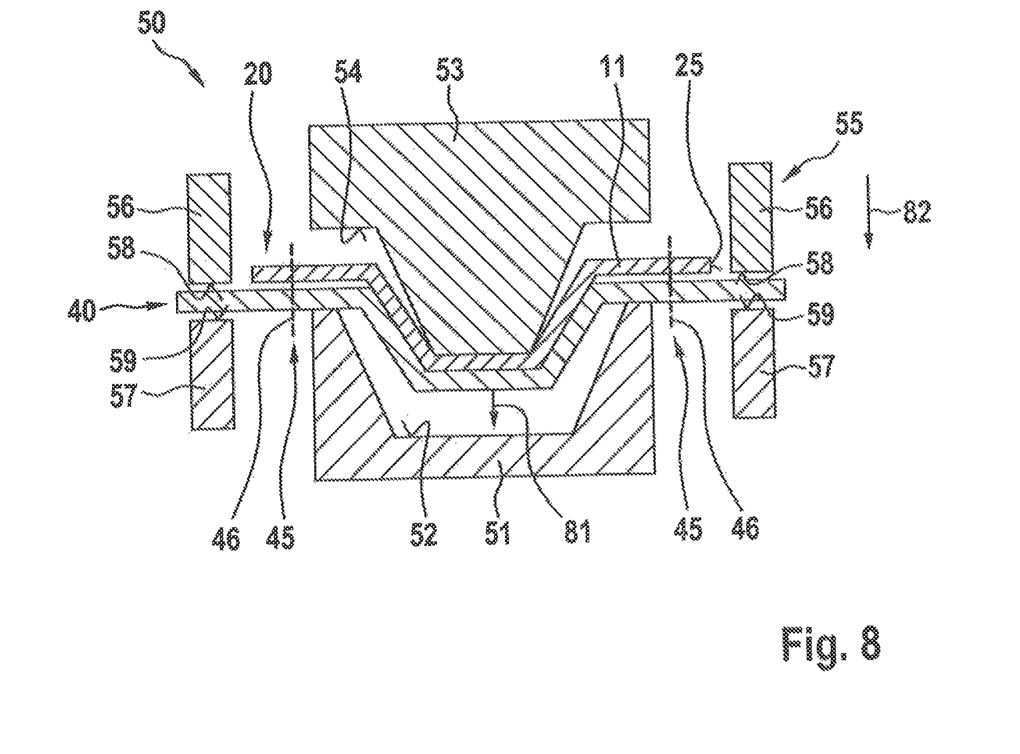

In the transition to the intermediate state illustrated in FIG. 8, the assembly, configured in the manner of a planar structure, of the carrier 40 having the textile composite material portion 20 fixed thereto, is incorporated in a device 50 for producing a textile composite material preform.

The device 50 according to the invention is composed fundamentally of a mold which is formed by a first and lower part-mold 51 having a mold face 52, and by a second and upper part-mold 53 having a mold face 54.

In the illustration according to FIG. 8, the assembly of the carrier 40 and of the textile composite material portion 20 has already been incorporated in the interior of the molds 51 and 53.

By lowering the second or upper mold 53 along the direction of the arrow 81 onto the first or lower mold 51 as the counter-mold, the assembly of the carrier 40 and of the textile composite material portion 20 is deformed in a corresponding manner. It is important herein that the assembly of the carrier 40 and of the textile composite material portion 20 is aligned and fixed so as to guarantee a pre-defined bearing contact between the molds 51 and 53 and a defined input of force.

In order for the latter to be guaranteed, the device 50 according to the invention apart from the molds 51 and 53 has a guide frame 55 having a first or upper frame portion 56 having a clamping face 58, and a second and lower frame portion 57 having a clamping face 59.

As lowering of the second mold 53 onto the first mold 51 as the counter-mold begins, the guide frame 55 is also lowered by lowering the first or upper frame portion 56 in the direction of the arrow 82 onto the second or lower frame portion 57. Herein, the carrier 40 but not the textile composite material portion 20 is clamped between the clamping faces 58 and 59 of the frame portions 56 and 57, the carrier 40 on account thereof being pre-draped, aligned, and/or mounted.

The subsequent and further lowering of the mold 53 onto the mold 51 as the counter-mold then leads to a positively defined input of force and to the corresponding forming process in terms of the textile composite material portion 20 that is fixed to the carrier 40 and thus to the shaping of the textile composite material preform 30.

Figure 9:
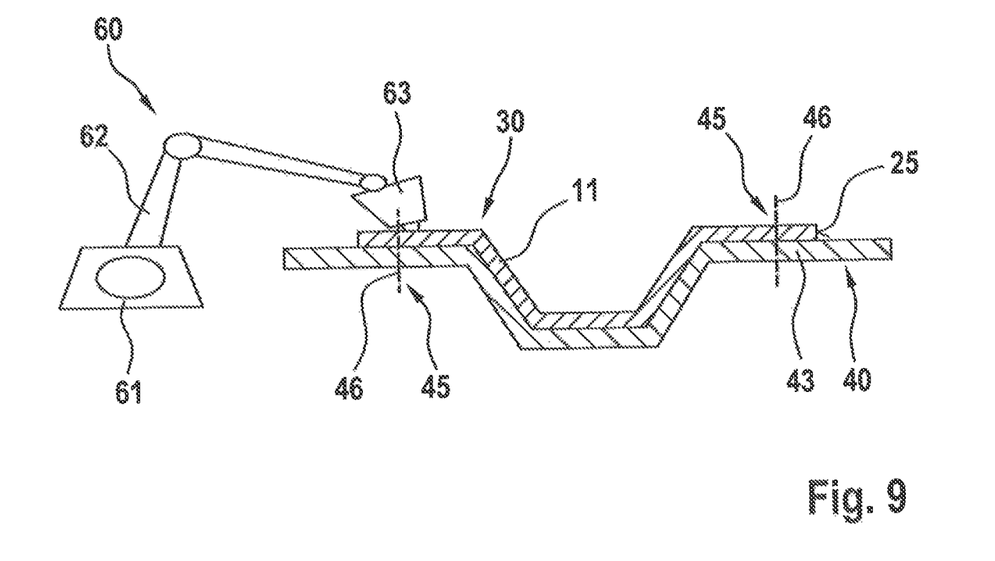

After the removal of the assembly of the molds 51 and 53 a shaped structure made from the carrier 40 having the textile composite material preform 30 still fixed thereto is thus present, as is illustrated in FIG. 9.

By using a trimming device 60, the actual textile composite material preform 30 can be released from the fixation to the carrier 40 by way of a trimming installation 63 which by way of an arm 62 is connected to a respective foot 61. This is performed in that a respective cut following the contour 25 is carried out, for example, on the proximal side or on the internal side of the seam 45.

Figure 10:
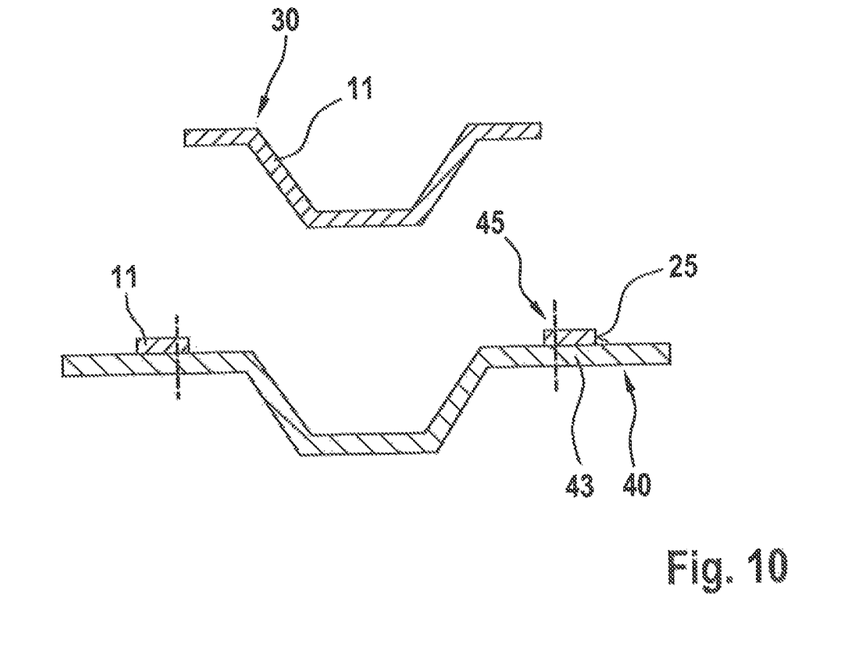

In the transition to the intermediate state illustrated in FIG. 10, the actual textile composite material preform 30 can then be released from the assembly of the carrier 40 after the cut has been carried out.

Figure 11:
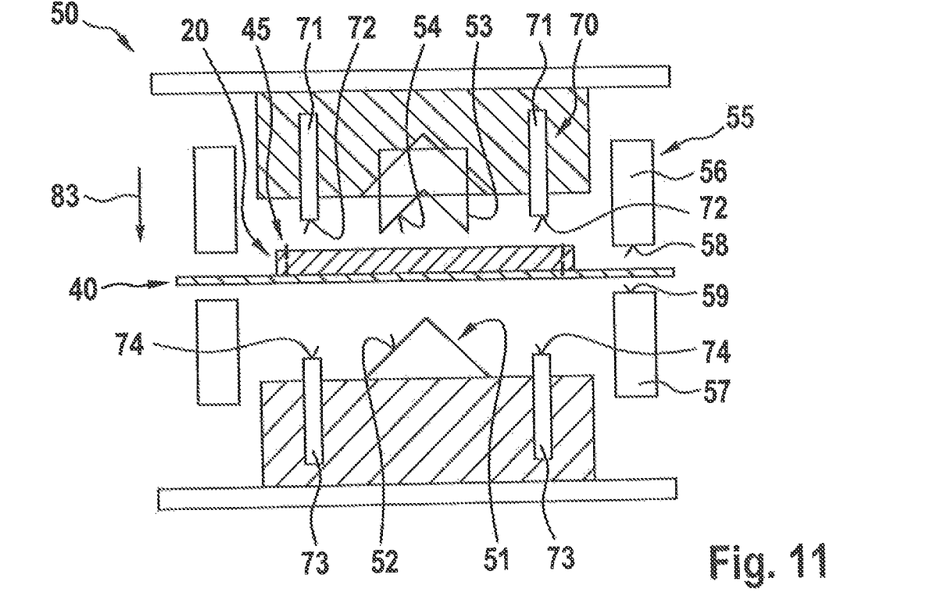
FIGS. 11 and 12 in a schematic and sectional side view show aspects of the use of a device according to the invention for producing textile composite material preforms.
Figure 12:
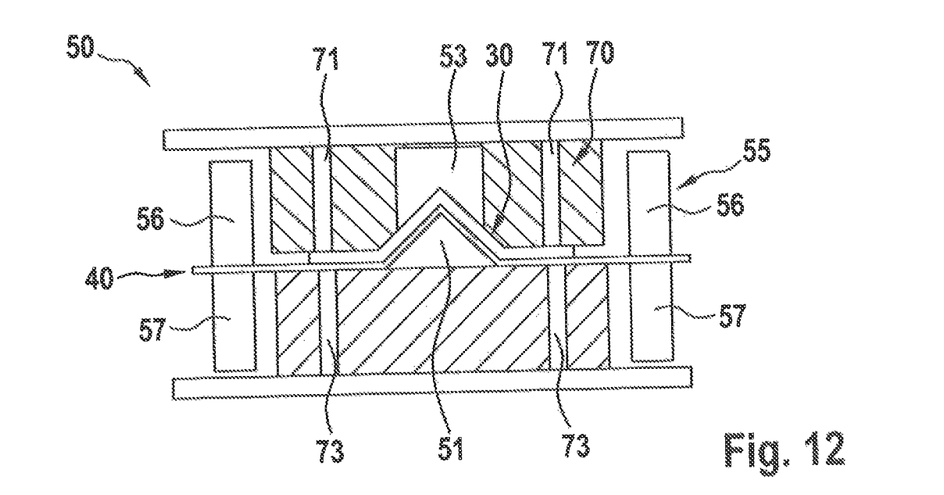
Figure 13:
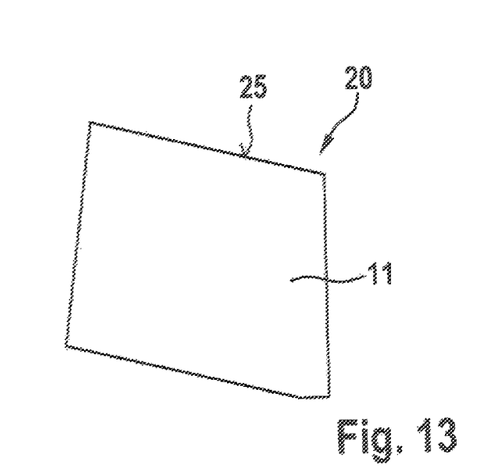
FIGS. 13 to 18 by means of schematic views from above onto planar structures to be used according to the invention in the production method illustrate material savings that can be achieved.
Figure 14:
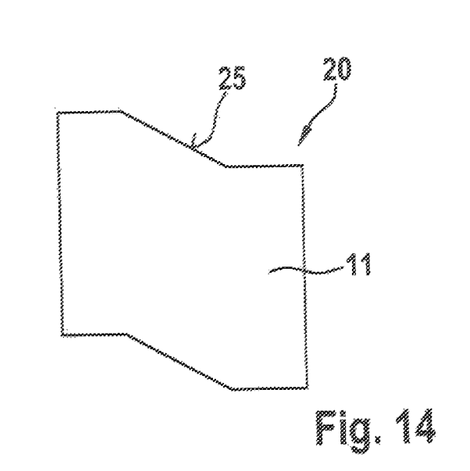
Figure 15:
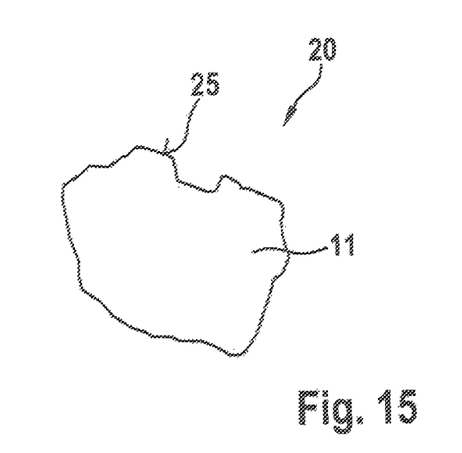

FIGS. 11 and 12 in a schematic and sectional side view show details in the use of another embodiment of the device 50 according to the invention for producing textile composite material preforms 30.

The configuration of the device 50 according to FIGS. 11 and 12 in the core thereof corresponds to the embodiment of the device 50 according to the invention as has been described in the context of FIG. 8.

Additionally, the three-dimensional main tentering frame 70 is illustrated in detail in the case of the embodiment of the device 50 according to the invention according to FIGS. 11 and 12.

In the case of the embodiment according to FIG. 8 the guide frame 55 having the frame portions 56 and 57 serves exclusively for pre-draping, aligning, and/or mounting the assembly of the carrier 40 and of the textile composite material portion 20 by way of the input of force into the carrier 40 but not into the textile composite material 11 of the textile composite material portion 20. This is likewise the case in the embodiment of the device 50 according to the invention according to FIGS. 11 and 12.

However, it is additionally advantageous for actual and three-dimensional main tentering frame 70 having a first or upper frame portion 71 having a clamping face 72, and a second and lower frame portion 73 having a clamping face 74 to be provided for a comparatively high input of force, such as the main tentering frame 70 is illustrated in FIG. 11.

The frame portions 71 and 73 are disposed such that the former when lowered in the direction of the arrow 83 do not lead to an exclusive pre-tensioning of the carrier 40, as is effected by the guide frame 55, but lead to a three-dimensional input of force onto the textile composite material portion 20 by fixing the textile composite material portion 20 between the clamping faces 72 and 74 of the first and second frame portions 71 and 73, here specifically on the internal side or the proximal side of the seam 45 and in direct vicinity to the latter, while interacting with the clamping between the mold faces 52 and 54 of the first and second part-molds 51 and 53, respectively.

FIGS. 13 to 18 in a schematic plan view show how various proportions of material surplus 90 can be saved according to the invention by the singularization of the textile composite material portions 20 that is upstream of the molding process.

Depending on the complexity of the contours 25 of the individual textile composite material portions 20, various degrees of superimposition or degrees of utilization of a supplied web made from a textile composite material 11 are obtained.

In the case of the conventional approach, the material surplus 90 which would not suffice for designing a complete textile composite material preform 30 would indeed be compression-molded and thus converted. However, the surplus material 90 would thereafter have to be recycled in a complex manner.

By way of the singularization of the textile composite material portions 20 that is provided upstream according to the invention, the material surplus 90 is created in a non-processed form and above all in a comparatively small quantity, such that the investment in terms of energy and time is reduced in recycling.

FIGS. 19 to 22 show intermediate states of a conventionally used method for producing textile composite material preforms 30.

Figure 19:
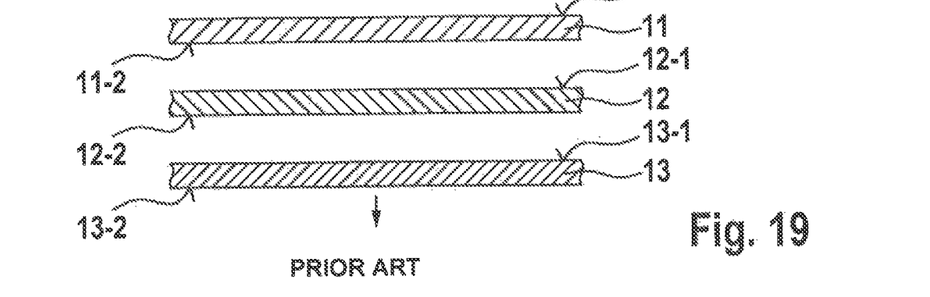
FIGS. 19 to 22 in a schematic and sectional side view show intermediate states which are attained in the case of a conventional method for producing textile composite material preforms.
Figure 20:
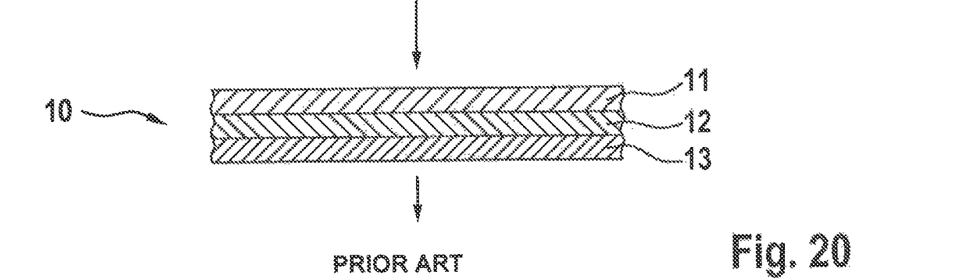

In the case of this example, three textile composite materials 11, 12, and 13 in the form of webs having upper sides 11-1, 12-1, 13-1, and lower sides 11-2, 12-2, 13-2, are supplied and disposed tier-on-tier in the manner of a planar structure 10 according to FIG. 20.

Figure 21:
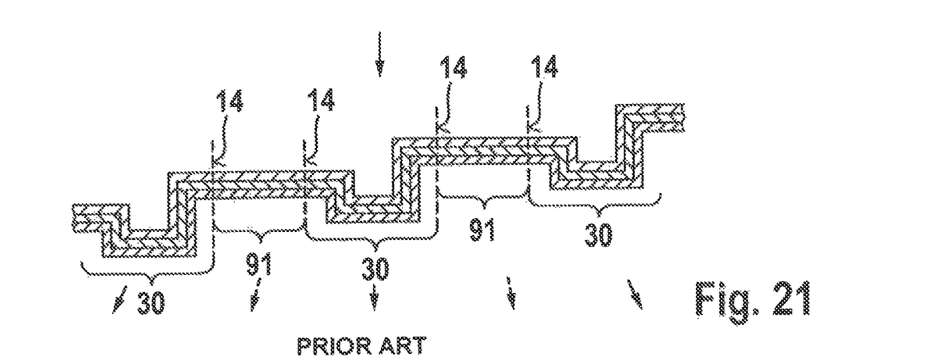

A procedure of compression molding is then carried out in the transition to the intermediate state illustrated in FIG. 21.

The entire planar structure 10 made from textile composite materials 11, 12, 13 is collectively or successively shaped herein. Portions which correspond approximately to the textile composite material preforms 30 to be produced are created herein, the portions however still being connected to one another by portions of material surplus 91 therebetween, so as to form a unified structure.

Figure 22:
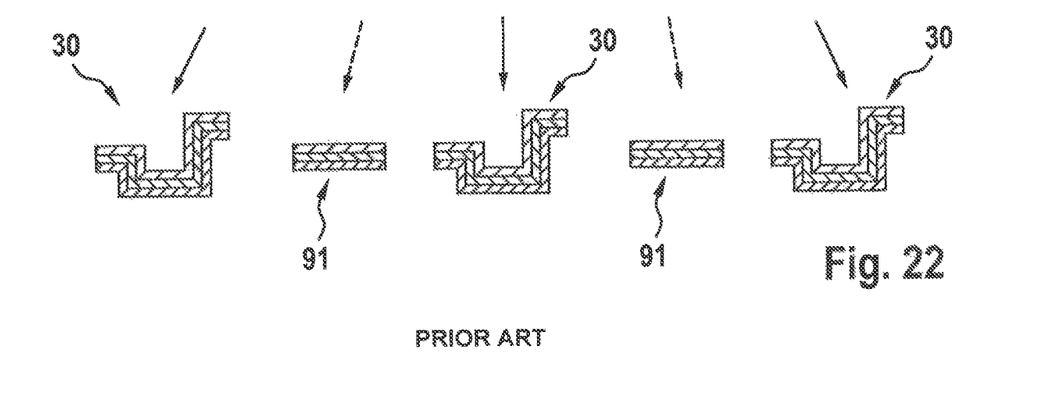

In the transition to the intermediate state illustrated in FIG. 22, the various textile composite material preforms 30 are then singularized from one another at separation lines 14, while releasing the material surplus 91.

Figure 16:
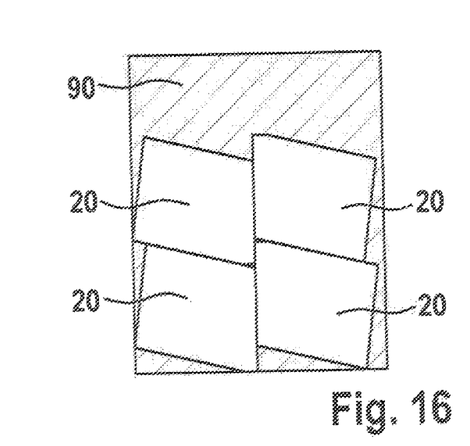
Figure 17:
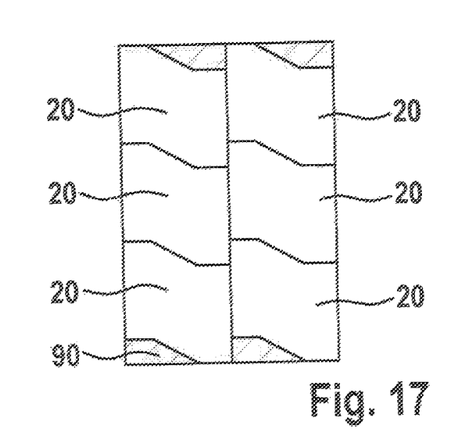
Figure 18:
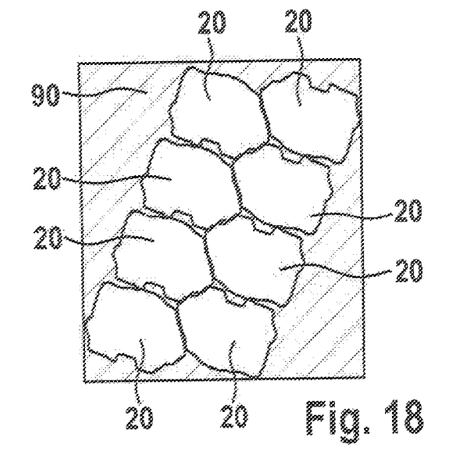

As opposed to the approach according to the invention which according to FIGS. 16 to 18 delivers easy-to-recycle material surplus 90 in a non-processed form, the material surplus 91 according to FIGS. 21 and 22 has already been subjected to the compression-molding procedure and is therefore recyclable only at a comparatively high investment in terms of time and energy.

This and further features and properties of the present invention will be explained in more detail by means of the following analysis.

The production of fiber composite components can be performed by way of the following individual steps:

production of the stack composed of individual tiers of CF textiles;

preliminary forming of fibers in the manner of a preform and by means of a dual-shell forming tool having a tentering frame in a forming press;

tailoring by means of a supply device in which the various preforms are placed and aligned in relation to one another; and injection process by means of a dual-shell forming tool having an injection system for impregnation in a molding press.

The following disadvantages are to be mentioned herein:

the external contour of the CF blank in geometrical terms is of only simple design, for example by way of polygon line, rectangle, etc., so as not to allow excessive cutting waste to be generated;

the material type of the individual tiers is limited since only semi-finished products directly-off-the-roll can be processed;

the angular orientation of the blank depends on the initial angular orientation of the semi-finished product;

there is a restricted integration of components since a variability, for example by incorporating patches, cannot be represented in a product;

a high investment in terms of material due to additional faces for introducing the retention forces by way of the tentering frames; and overlaps in the preform are simple and represent a weak point in the unified structure.

According to the invention, CF blanks, thus textile composite material portions 20, are to be processed to form a fiber preform 30, the textile composite material portions 20 in an upstream process of stitching being stitched onto a cost-effective carrier material 43 of a carrier 40. The processing of a hybrid stack thus formed is subsequently performed in a fiber preform tool 51, 53 of a respective device 50.

The preform tool 50 is equipped with an external guide frame 55 which during the tool closing movement pre-drapes the hybrid stack 20 over the carrier 40 having the carrier material 43 in the tool.

A material transfer to an inboard and three-dimensional main tentering frame 70 is performed on the CF blank of the respective textile composite material portion 20 after the pre-draping, during the further closing movement of the molds 51, 53 of the tool. The shaping of the blank of the respective textile composite material portion 20 to the preform or to the textile composite material preform 30 is also performed here.

Furthermore, inboard tool slides in a cascade arrangement, which enable fixing of the fibrous mats from the inside to the external region of the preform are set down during the shaping.

The introduction of force by way of forming is performed over the cascade of the guide frame 55, the carrier 40 having the carrier material 43, the stitching by way of the seam 45, cutting-to-size the CF blank of the textile composite material portion 20, the cascade slide.

The following advantages are obtained:

a reduction in the investment in terms of material and thus a reduction in terms of material costs;

an increase in the product diversity and the achievement of three degrees of freedom for comparatively complex components;

an improvement of the results in terms of quality, a reduction in terms of feature specifications; and a reduction in the scatter of features; stable and robust processes.

LIST OF REFERENCE CHARACTERS

10 Planar structure
10-1 Upper side
10-2 Lower side
11 Textile composite material
11-1 Upper side
11-2 Lower side
12 Textile composite material
12-1 Upper side
12-2 Lower side
13 Textile composite material
13-1 Upper side
13-2 Lower side
14 Sectional line, sectional edge
20 Textile composite material portion
20-1 Upper side
20-2 Lower side
21 (First) textile composite material portion
22 (Second) textile composite material portion
23 (Third) textile composite material portion.
25 Contour, periphery
30 Textile composite material preform
30-1 Upper side
30-2 Lower side
31 (First) textile composite material preform
32 (Second) textile composite material preform
33 (Third) textile composite material preform
35 Contour, periphery
40 Carrier, carrier material
41 Upper side
42 Lower side
43 Carrier material
45 Seam
46 Seam material
50 Device
51 (First, lower) half-mold, part-mold, mold
52 (First) mold face
53 (Second, upper) semi-mold, part-mold, counter-mold
54 (Second) mold face
55 Guide frame
56 (First, upper) frame portion
57 (Second, lower) frame portion
58 Clamping face
59 Clamping face
60 Trimming device
61 Foot
62 Arm
63 Trimming installation
70 (Three-dimensional) main tentering frame
71 (First, upper) frame portion
72 Clamping face
73 (Second, lower) frame portion
74 Clamping face
81 Direction of lowering
82 Direction of lowering
83 Direction of lowering 90 Material surplus
91 Material surplus The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing textile composite material preforms, comprising the acts of:
    laterally cutting a planar structure of one or a plurality of textile composite materials into textile composite material portions prior to compression molding; and
    after the act of laterally cutting, compression molding of the textile composite material portions to produce the textile composite material preforms;
    wherein a respective textile composite material portion prior to the compression molding is fixed to a first carrier;
    wherein the respective textile composite material portion is fixed to the first carrier by stitching and configuring a seam having a seam material;
    wherein the first carrier after the compression molding is released from a lower side of the respective produced textile composite material preform;
    wherein the first carrier after the compression molding is released from the lower side of the respective produced textile composite material preform by unpicking the seam and/or by a cut within the seam that follows a contour or the seam.

2. The method as claimed in claim 1:
    wherein the first carrier is a textile carrier material and/or is a planar material.

3. The method as claimed in claim 1, wherein the seam is at least partially configured as a contour seam and is disposed in a vicinity of a contour of the respective textile composite material portion.

4. The method as claimed in claim 1:
    wherein the seam is at least partially configured so as to be spaced apart from a contour of the respective textile composite material portion and/or so as not to be parallel with the contour.

5. The method as claimed in claim 1:
    wherein the first carrier is first pre-draped by pre-tensioning in a guiding manner by a guide frame that contacts only the first carrier and wherein an interior of the guide frame laterally encloses the respective textile composite material portion;
    wherein the respective textile composite material portion along the contour and/or along the seam is then tensioned in a three-dimensional manner and on account thereof, under pressure, traction, and/or temperature, is configured so as to produce the respective textile composite material preform.

6. The method as claimed in claim 5, wherein the respective textile composite material portion is tensioned by a main tentering frame and/or by a mold and a counter-mold.

7. The method as claimed in claim 1, wherein the lateral cutting is adapted in terms of dimensions and/or further properties of the textile composite material preform to be produced.

8. The method as claimed in claim 1, wherein the lateral cutting is based on a main tentering frame, a mold, and/or a counter-mold to be used for producing the textile composite material preform.

* * * * *